(12) United States Patent
Mackowiak et al.

(10) Patent No.: US 9,969,256 B2
(45) Date of Patent: May 15, 2018

(54) MODULAR HOUSING FOR A HYBRID MODULE

(71) Applicant: Schaeffler Technologies AG & Co. KG, Herzogenaurach (DE)

(72) Inventors: Stefan Mackowiak, Malsch (DE); Matthias Eisele, Durmersheim (DE); Robert Maier, Gernsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/315,145

(22) PCT Filed: Jun. 1, 2015

(86) PCT No.: PCT/DE2015/200325
§ 371 (c)(1),
(2) Date: Nov. 30, 2016

(87) PCT Pub. No.: WO2015/188819
PCT Pub. Date: Dec. 17, 2015

(65) Prior Publication Data
US 2017/0190245 A1    Jul. 6, 2017

(30) Foreign Application Priority Data
Jun. 11, 2014    (DE) .................. 10 2014 211 143

(51) Int. Cl.
*B60K 6/405* (2007.10)
*B60K 6/48* (2007.10)
(Continued)

(52) U.S. Cl.
CPC ............ *B60K 6/405* (2013.01); *B60K 6/48* (2013.01); *B60K 17/02* (2013.01); *H02K 5/225* (2013.01); *H02K 7/006* (2013.01); *H02K 7/108* (2013.01)

(58) Field of Classification Search
CPC . B60K 6/40; B60K 6/405; B60K 6/48; B60K 17/02; H02K 7/006
See application file for complete search history.

(56) References Cited

U.S. PATENT DOCUMENTS

2006/0100060 A1*   5/2006   Kraska .................. B60K 6/405
                                                              477/156
2006/0289209 A1*  12/2006   Grosspietsch .......... B60K 6/26
                                                              180/65.25
(Continued)

FOREIGN PATENT DOCUMENTS

| EP | 1541401 | 6/2005 |
|---|---|---|
| EP | 1736345 | 12/2006 |
| WO | 2006034520 | 4/2006 |

*Primary Examiner* — Erez Gurari
(74) *Attorney, Agent, or Firm* — Volpe and Koenig, P.C.

(57) ABSTRACT

The invention relates to a hybrid module including a clutch, an electric machine, an internal combustion engine end, a transmission end, and a housing that includes a radially extending housing section located axially next to the electric machine at the internal combustion engine end as well as an axially extending housing section surrounding at least part of the hybrid module; the housing has two separate parts, the first one of which forms the radially extending housing section and the second one of which forms the axially extending housing section. The invention further relates to a method for manufacturing a hybrid module of this type.

8 Claims, 5 Drawing Sheets

(51) Int. Cl.
  *B60K 17/02* (2006.01)
  *H02K 7/108* (2006.01)
  *H02K 5/22* (2006.01)
  *H02K 7/00* (2006.01)

(56) References Cited

U.S. PATENT DOCUMENTS

| | | | | |
|---|---|---|---|---|
| 2007/0265129 | A1* | 11/2007 | Kasuya | B60K 6/365 475/32 |
| 2008/0023287 | A1* | 1/2008 | Thiede | B60K 6/26 192/48.1 |
| 2008/0093135 | A1* | 4/2008 | Nomura | B60K 6/26 180/65.24 |
| 2009/0200094 | A1* | 8/2009 | Zohrer | B60K 6/387 180/65.22 |
| 2009/0251018 | A1* | 10/2009 | Koshida | B60K 6/26 310/89 |
| 2010/0105518 | A1* | 4/2010 | Kasuya | B60K 6/387 477/5 |
| 2011/0240431 | A1* | 10/2011 | Iwase | B60K 6/26 192/3.29 |
| 2012/0217830 | A1* | 8/2012 | Iwase | B60K 6/26 310/78 |
| 2013/0193816 | A1* | 8/2013 | Iwase | H02K 7/003 310/75 R |
| 2013/0305878 | A1* | 11/2013 | Seno | F16H 57/0423 74/665 A |
| 2014/0230423 | A1* | 8/2014 | Iwase | B60K 6/26 60/445 |
| 2015/0000262 | A1* | 1/2015 | Iwase | F16H 45/00 60/330 |
| 2015/0258884 | A1* | 9/2015 | Ideshio | B60K 6/405 180/65.25 |
| 2016/0169374 | A1* | 6/2016 | Kanada | B60K 6/365 475/5 |
| 2016/0214473 | A1* | 7/2016 | Kanada | B60K 6/365 |
| 2016/0230850 | A1* | 8/2016 | Kanada | B60K 6/365 |
| 2017/0080793 | A1* | 3/2017 | Suyama | F16H 57/042 |
| 2017/0158042 | A1* | 6/2017 | Miyazawa | B60W 20/00 |
| 2017/0190245 | A1* | 7/2017 | MacKowiak | B60K 6/405 |
| 2017/0203643 | A1* | 7/2017 | Suyama | B60K 6/387 |

* cited by examiner

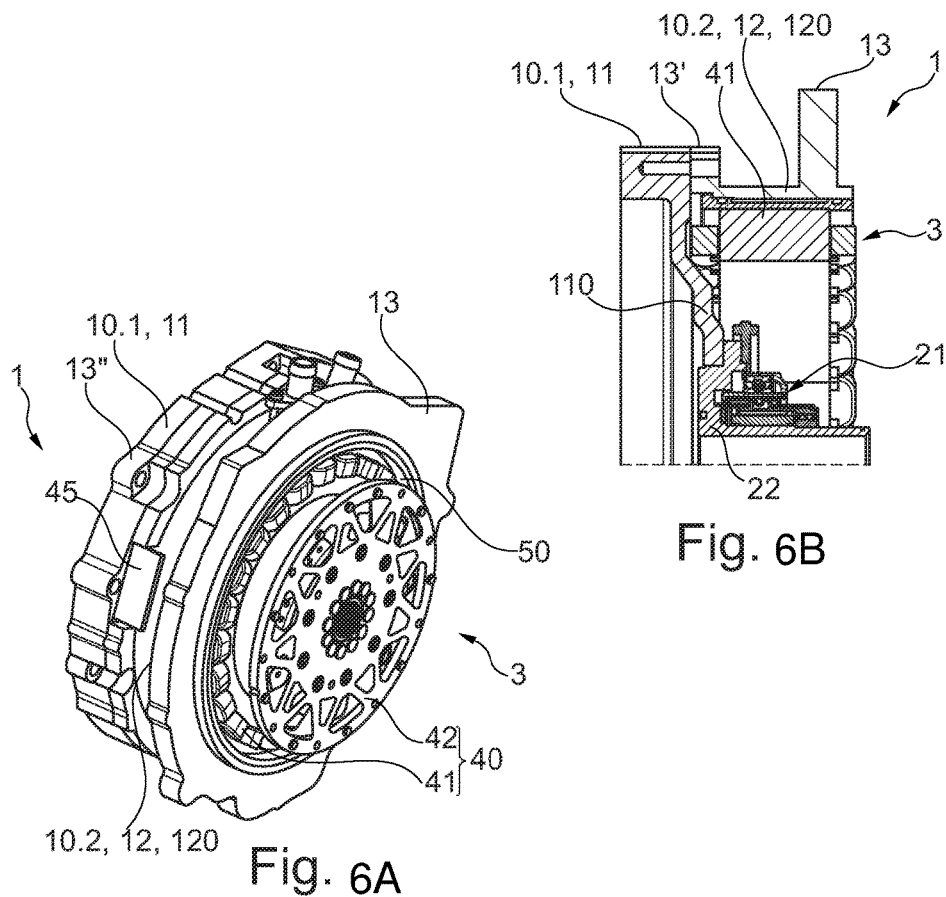
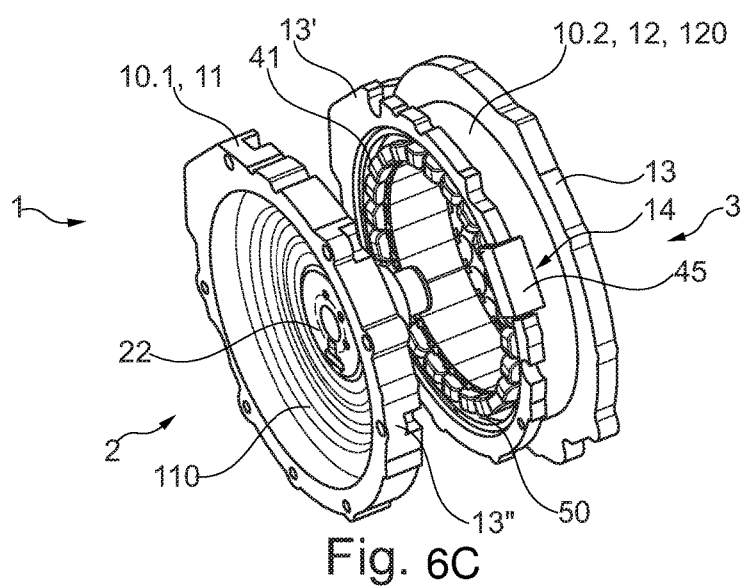

MODULAR HOUSING FOR A HYBRID MODULE

BACKGROUND

The invention relates to a hybrid module for hybrid driven machines, particularly vehicles with a hybrid drive, which include a combination of an electric motor and an internal combustion engine.

The valuable contribution to prior art under application number DE 10 2013 224 109.7 shows an example of such a hybrid module. It comprises a hybrid module housing in which an intermediate wall is embodied between the vibration damper and the electric machine, integral with the housing.

The inventors have defined the objective to further improve the noted prior art. In particular, the assembly expense shall be reduced and the compatibility of the hybrid module shall be increased.

SUMMARY

This objective is particularly attained in a hybrid module with a clutch, an electric machine, an internal combustion engine end, and a transmission end, with the hybrid module comprising a housing with a radially extending housing section, which is arranged at the internal combustion engine end axially next to the electric machine, and with an axially extending housing section which surrounds the hybrid module at least partially, and with the housing comprising two separate components, with the first part forming the radially extending housing section and the second part forming the axially extending housing section.

This objective is further attained particularly in a method for the production of a hybrid module with a clutch, an electric machine, an internal combustion engine end, a transmission end, and a housing, in which the following step is performed:

Connecting a first part to a second part, with a radially extending housing section forming the first part, which in the assembled state of the hybrid module is arranged at the internal combustion engine end axially next to the electric machine, and with an axially extending housing section forming the second part, which in the assembled state of the hybrid module at least partially surrounds the hybrid module.

A modular design of the housing is yielded by the separate embodiment of the two parts, which leads to a higher degree of flexibility for the production and application. Interfaces with other abutting parts, for example engine or transmission, can be defined in a more flexible fashion. For example, independent from the exterior diameter of the electric machine, here an interface can be ensured for the transmission itself via a flange projecting inwardly, because by the assembly of the electric machine and the cooling channel from the internal combustion engine end possible due to the modular design, the flange contour of the housing can be pulled radially inwardly at the transmission end of the hybrid module, providing sufficient material for a threaded connection to the transmission. Now, a selection can be made between various sequences for the assembly of the components of the hybrid module, cables can be released more easily, and the housing can even be provided at the face side with an opening having a smaller diameter or a flange projecting radially inwardly such that the compatibility to various sizes of transmission bells is increased, particularly to those with smaller exterior diameters than the exterior diameter of the housing of the hybrid module. For example, a separate first part, serving e.g. as an intermediate wall, provides advantages with regards to the wiring of the rotor position sensor. This way it is possible for example that during the assembly preferably the cable is already placed at the intermediate wall on the E-machine side or laid in the intermediate wall and fastened there. This way, any passing of the sensor cable through the intermediate wall, as presently common, is no longer required. This is advantageous for the rigidity and sealing of the wall. This first part can here also have another axial section radially surrounding the vibration damper. By this construction then the cables can also be guided axially in the direction towards the engine out of the housing of the hybrid module.

In the following the use of the terms radially and axially refers to the axis of the rotor of the hybrid module.

The electric machine preferably comprises a rotor in which the clutch is integrated. The hybrid module housing is preferably embodied without an integral intermediate wall for connecting the clutch system to the rotor.

The radially extending housing section is preferably a wall section which extends between a radially exterior point to a radially interior point and with its radial extension being greater than the axial extension. A radial extension is here also understood as an essentially radial extension, i.e. in the extreme case for example that the angle between the axis and the radial housing section is greater than 45°. Axially arranged next to the electric machine is understood here such that coming from the internal combustion engine end in the axial direction first the radially extending housing section is arranged and then the electric machine. Preferably the first part forming the radially extending housing section comprises an opening for passing a shaft through it (e.g. rotor shaft or driveshaft or shaft between the clutch and the vibration damper). Particularly preferred the opening comprises a bearing, e.g., a single-row or multi-row roller bearing, which supports the shaft rotationally in reference to the housing section. It is preferred that the first part is a sealing dividing wall between a housing chamber in which the electric machine operates with a clutch, preferably a wet one, and an exterior chamber or a space in which a vibration damper is arranged. The first part, preferably embodied as an intermediate wall, is preferably made from steel (e.g., steel sheeting, cast part) or aluminum (e.g., die casting).

Preferably the clutch comprises an actuating device, which is indirectly or preferably directly supported by the first part. The actuating device is an electronic central shifter, for example. The support of the actuating device occurs preferably via a support device; it is particularly preferred if the support device of the actuating device is an integral component of the first part. For example, a support device of an electronic central shifter and the radially extending housing section are embodied by the first part for example as a radially extending housing section embodied as an intermediate wall (e.g. as a cast part).

The axially extending housing section is preferably a wall section which extends between two points axially distanced from each other and with its radial extension being smaller than the axial extension. Here, an axial extension is also understood as an essentially axial extension, i.e. in the extreme case that the angle between the axis and the radial housing section is smaller than 45°, for example. The axially extending housing section surrounds the hybrid module, preferably the electric machine and/or a vibration damper, at least partially, i.e. it exhibits partially an annular cross-section and/or surrounds once the rotor axis/drive axis, for example. Preferably it surrounds the hybrid module essentially like a cylinder barrel jacket, particularly completely. It is preferred for the second part, which forms the axially extending housing section, to represent a sealing separating wall between a housing chamber in which the electric machine runs with a clutch, preferably a wet one, and an exterior space.

In the method according to the invention the two parts are connected to each other, with this way an indirect, preferably a direct connection being encased. The connection preferably represents a threaded connection.

In another hybrid module according to the invention the second part comprises a flange at the transmission end for connecting a transmission bell, with the flange defining a contour which shows at least one contour section (preferably several contour sections) which is/are located radially inside the exterior diameter of the axially extending housing section.

By the combination of such an inwardly projecting flange with the modular design of the housing now simultaneously a simple assembly is possible with higher compatibility of the hybrid module to differently sized transmission bells. Therefore, depending on the technical specifications, it may be possible that the flange area of the transmission bell and thus the pitch circle for the threaded connection can be designed with smaller dimensions than the exterior contour of the housing of the hybrid module. In this case the threaded connection of the hybrid module according to prior art to the transmission is impossible, because no material is available inside the housing; here it cannot be provided e.g., in the form of a flange because otherwise the components of the hybrid module, such as cooling channel, but perhaps also the stator, rotor, or clutch, cannot be inserted any longer into the housing with the here reduced opening at the transmission side. However, in the hybrid module according to the invention the assembly of the parts, or at least the cooling channel and/or the stator, occurs coming from the side of the internal combustion engine, which is possible because no integral intermediate wall blocks the path.

Preferably the flange has fastening points in the contour sections located radially inwardly. A fastening point is preferably a point in which a force-fitting and/or form-fitting and/or material-to-material connection of the second part occurs or shall occur to the transmission. This represents for example a bore hole and/or a thread and/or a groove or an oblong hole. Preferably the flange contour is pulled radially inwardly towards the transmission, depending on the flange situation of the transmission bell.

It is preferred that at least one contour section is located radially inside the interior diameter of the axially extending housing section.

Preferably the axially extending housing section surrounds the electric machine (not the vibration damper) when a flange is provided.

Preferably at least one contour section is located radially inside the exterior or interior diameter of a cooling channel. This way a transmission bell with a slightly smaller diameter can also be assembled, while still allowing (depending on the concrete geometry) the stator, rotor, and clutch to be assembled coming from the transmission side.

It is preferred that at least one contour section is located radially inside the exterior or interior diameter of the stator. This way a transmission bell can be assembled with an even smaller diameter, while still allowing (depending on the concrete geometry) the rotor and the clutch to be assembled coming from the transmission side.

Preferably at least one contour section is located radially inside the exterior or interior diameter of the rotor. This way a transmission bell with a very small diameter can be assembled, with here still allowing (depending on the concrete geometry) that the clutch is assembled coming from the transmission side.

It is preferred that at least one contour section is located radially inside the exterior or interior diameter of the clutch. This way a transmission bell can be assembled with a very, very small diameter.

In another hybrid module according to the invention the hybrid module comprises a vibration damper, and the first part is arranged as an intermediate wall axially between the vibration damper on the one side and the electric machine and/or the clutch on the other side.

This way a very compact design can be chosen. Preferably the intermediate wall seals the housing chamber, which surrounds the electric machine and/or the clutch, and the housing chamber, in which the vibration damper is located, in reference to each other. The second part preferably forms a housing chamber for the vibration damper and a housing chamber for the electric machine.

The vibration damper is preferably a torsional vibration absorber.

In another hybrid module according to the invention the first part is preferably connected indirectly, particularly preferred directly to the second part and/or a cooling channel and/or a stator of the electric machine.

It is preferred for the parts to be connected to each other in a torque-proof fashion.

In another hybrid module according to the invention the first part and/or the second part has a recess for guiding or passing through a sensor and/or control cable and/or an electric contact for supplying the electric machine and/or an actuating device of the clutch with electric energy.

This allows for a flexible and secure wiring or contacting. It is preferred that the recess is provided at an edge of the part, i.e. here the recess is not completely surrounded by the material of the part. This way it is not required to guide the wire or the contacting through a hole, and thus it is not necessary to disassemble any potentially given plugs, or simply an easier assembly is possible.

In another hybrid module according to the invention the housing has two housing halves, with one housing half comprising the first part and the other housing half comprising the second part.

This allows a quick assembly by combining the two housing halves. It is not mandatory that one housing half represents half of the volume or weight of the entire housing. Preferably here a housing half is understood that upon combining two housing halves the housing is completed, preferably essentially completed. It is preferred that the individual housings are each pre-assembled and then connected to each other. It is preferred that one or both housing halves represent a one-piece part.

The housing comprises here e.g. a transmission end housing part as the second housing half, in which preferably a cooling channel and the stator of the E-machine are integrated. The fastening of the cooling channel occurs preferably, as described above, via a threaded connection. It is preferred for the housing part at the transmission end to have openings for the threaded connections to the transmission bell.

It is preferred that as the first housing half an intermediate wall is integrated in a housing part at the motor side by a second part, at which preferably the clutch system is fastened. The first housing half preferably encompasses the vibration damper radially outside in the axial direction and preferably it includes e.g., guides for the rotor position sensor at the transmission side.

Both housing halves are preferably screwed together during the final assembly. Preferably a seal is provided between the housing halves. Preferably one or both housing halves include(s) recesses receiving a cable or an electric contacting. Thus, any penetration in the intermediate wall is not required for the cable of the rotor position sensor (the cable is fastened at the side of the electric machine) because it can be guided via the connection site of the two housing halves towards the outside. Additionally, an electric contacting can occur between the housing parts to supply the electric machine with electric drive energy, with the contacts preferably being coated in plastic. Preferably the cooling channel can be screwed to the second part or the second housing half. The threaded connection of the cooling channel in the housing can occur without requiring additional structural space between the housing parts.

In another hybrid module according to the invention the recess is provided in an area in which the two components contact each other or the recess is provided in an area in which the two housing halves are contacting each other.

This way a cable grommet or a contact grommet is easily possible, e.g., by assembling the halves or parts to each other. Preferably the recess is provided at the edge of the part, i.e. the recess is not completely surrounded by the material of the part, which yields the above-stated advantage.

In another method according to the invention, prior to connecting the first part and the second part, the following steps are performed:

Inserting one or more, preferably all of the following components of the hybrid module into the second part, preferably coming from the side of the internal combustion engine: cooling channel, stator;

Connecting an inserted component or at least one of several inserted components to the second part.

This way, particularly such components can be assembled which have a greater exterior dimension than a flange pulled inwardly. For example, the cooling channel is screwed separately into the hybrid module. Subsequently the intermediate wall is screw-connected in the housing, forming the first part, which housing is formed by the second part. Preferably the cooling channel and the intermediate wall are each centered in the housing. Alternatively a centering of the cooling channel can also occur in the housing and/or a centering of the intermediate wall at the cooling channel and/or vice versa.

In another method according to the invention, prior to connecting the first part to the second part, the following steps are performed:

Forming a pre-mounting assembly by preferably connecting the first part to one or more of the following components of the hybrid module, unless they have already been connected to the second part: cooling channel, stator, rotor, rotor position sensor, clutch, actuating device of the clutch;

Inserting the pre-mounting assembly into the second part, preferably coming from the side of the internal combustion engine.

This way, the assembly steps can be combined such that it is not required to insert the components individually into the housing to the extent assembled at said time. Additionally, a connection of the components to each other can be performed more easily when they are still outside the housing. For example, the intermediate wall and the cooling channel can be screwed together, bolted, riveted, or welded in a pre-assembly step. Subsequently the threaded connection is generated of the pre-mounted assembly in the housing. This represents an alternative to the above-mentioned sequence, in which first the cooling channel is inserted into the housing and screw-connected there. Alternatively or additionally the clutch and/or the clutch module are pre-assembled at the first part and/or here the intermediate wall for example. For example, the clutch system with the actuator device and the rotor are pre-assembled at the first part or the first housing half, which allows an easy fastening of the control cable or sensor cable for the actuator device, because the respective points are better accessible. Further preferred, the clutch and the cooling channel including the stator are pre-assembled at the first part and/or the intermediate wall and they are fastened as an assembly in the housing, which can be advantageous with regards to the assembly of the hybrid module.

In another method according to the invention, after the connection of the first part and the second part, the following steps are performed:

Inserting preferably one or more of the following components of the hybrid module into the second part, unless they have already been connected to the first part or the second part, and preferably coming from the internal combustion engine side or the transmission side: cooling channel, stator, rotor, rotor position sensor, clutch;

Connecting the first inserted component or at least one of several inserted components to the first part and/or the second part.

This way, even such components can be fastened in the hybrid module which still can be installed in an easy fashion or can only be installed when the first part has already been connected to the second part. For example the rotor can be inserted coming from the transmission side after the intermediate wall has been installed. Here, the rotor has an exterior diameter which is smaller than the interior diameter of the contour or the interior circumference of the flange at the transmission side. For example the intermediate wall is assembled in the housing as described above (as a part of an assembly or individually). Then similar to prior art the clutch module is assembled in the module as known from prior art at the acme of rotor and stator.

BRIEF DESCRIPTION OF THE DRAWINGS

The invention is now illustrated based on the example shown in the figures. Shown here are.

DETAILED DESCRIPTION OF THE PREFERRED EMBODIMENTS

Figure 1:
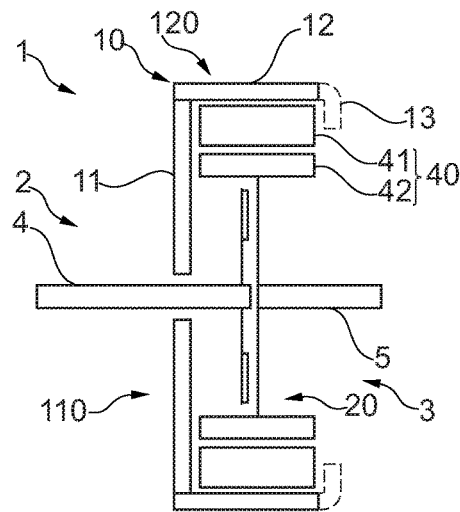
FIG. 1 a hybrid module according to the invention.

FIG. 1 shows a hybrid module 1 according to the invention. It includes a clutch 20, preferably comprising an actuator device, an electric machine 40, which here has a stator 41 and a rotor 42, an internal combustion engine end 2, and a transmission end 3, with in this example a shaft 5 being provided at the transmission end and a shaft 4 at the internal combustion engine end. It also has a housing 10 with a radially extending housing section 110, which is arranged at the internal combustion engine end axially next to the electric machine 40, and with an axially extending housing section 120 at least partially surrounding the hybrid module 1. The housing 10 comprises additionally two separate parts 11, 12, with the first part 11 forming the radially extending housing section 110 and the second part 12 forming the axially extending housing section 120. An optional flange 13 is indicated in dot-dash lines, which comprises the second part 12 at the transmission end for connecting to a transmission bell, with the flange 13 defining a contour which shows at least one contour section located radially inside the exterior diameter of the stator 41.

The production of the hybrid module 1 includes connecting the first part 11 to the second part 12.

This allows a more flexible axial insertion of the electric machine 40 and/or the clutch 20 from the left (internal combustion engine side) or the right (transmission side) and wiring can also be performed in an easier fashion. Various flange sizes of transmission bells, even those smaller than the hybrid module 1, can be connected to the hybrid module 1 via the optional flange 13, which then is not hindering such assembly because said assembly can be performed in a very flexible fashion.

Figure 2:
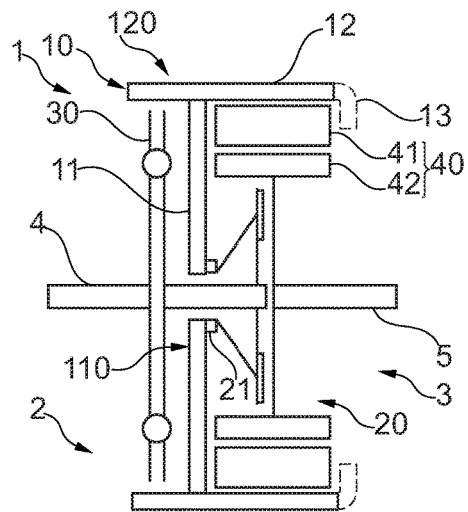
FIG. 2 a hybrid module according to the invention based on FIG. 1, with the hybrid module additionally comprising a vibration damper, FIG. 3 a hybrid module according to the invention similar to FIGS. 1 and 2, with the module comprising a housing with two housing halves, FIG. 4 a hybrid module according to the invention similar to FIG. 3, with a housing half at the transmission end representing the radially extending housing section, FIGS. 5A to 5C a hybrid module according to the invention based on FIG. 2, with the hybrid module comprising an intermediate wall as a first part, FIGS. 6A to 6C a hybrid module according to the invention, based on FIG. 3, FIGS. 7A to 7D the housing half of the module of FIGS. 6A-6C at the side of the internal combustion engine in various views and assembly states, and FIGS. 8A to 8D a housing half of the module of FIGS. 6A-6C at the transmission end in various views and assembly states.

FIG. 2 shows a hybrid module 1 according to the invention, based on FIG. 1, with the hybrid module 1 additionally having a vibration damper 30. The first part 11 is axially arranged as an intermediate wall between the vibration damper 30 on the one side and the electric machine 40 and the clutch 20 on the other side. The clutch 20 comprises an actuating device 21, which rests on the first part 11. The second part 12 also forms a housing chamber for the vibration damper 30.

This way a compact design develops.

Figure 3:
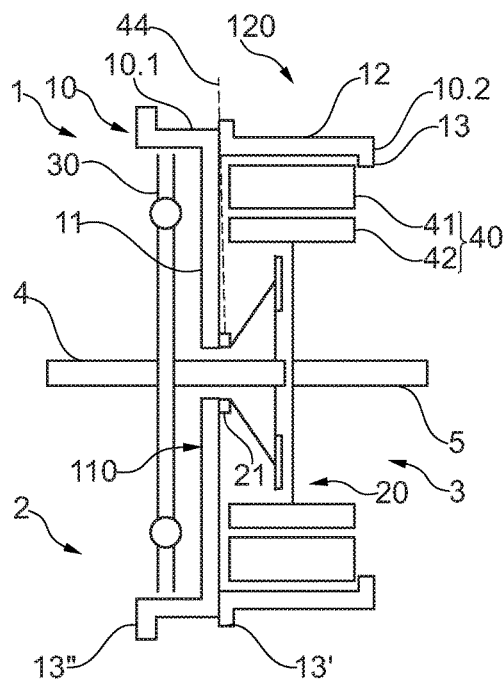

FIG. 3 shows a hybrid module 1 according to the invention similar to FIGS. 1 and 2, with the module comprising a housing 10 with two housing halves 10.1, 10.2. The housing half 10.1 at the internal combustion engine end comprises the first part 11 and the housing half 10.2 at the transmission end comprises the second part 12. The first part 11 comprises here an additional radial section by which it radially surrounds the vibration damper 30. Optionally the transmission end housing half 10.2 has a flange 13 at the transmission end for a threaded connection of the transmission to the housing half 10.2 as well as further a flange 13' at the internal combustion engine end for a threaded connection of the housing half 10.2 to the housing half 10.1. Optionally the housing half 10.1 at the internal combustion engine end comprises a flange 13" at the internal combustion engine end for a threaded connection to the internal combustion engine. Preferably a sensor cable 44, indicated in dot-dash lines, is guided at the radially extending housing section 110 radially outwardly between the housing halves 10.1, 10.2, with here no penetration being required in the radial housing section. Preferably a cooling channel 50 is arranged radially outside the stator 41 and inside the second housing half 10.2.

This way a simple assembly option is given. In particular, the individual housings are each preferably preassembled and then connected to each other. Transmissions with various pitch diameters can be screw-connected thereto with here only one housing half 10.2 being appropriately adapted.

Figure 4:
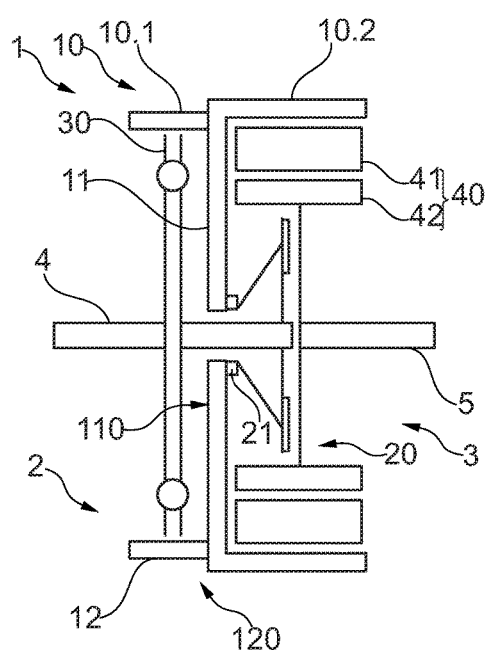

FIG. 4 shows a hybrid module 1 according to the invention similar to FIG. 3, with the housing half 10.2 at the transmission end comprising the radially extending housing section 110, formed by the first part 11. The housing half 10.1 at the internal combustion engine end comprises the axially extending housing section 120, formed by the part 12. This way the connection at the internal combustion engine end can be flexibly adjusted in its diameter because the assembly of the electric machine 40 occurs preferably coming from the transmission end 3.

Figure 5B:
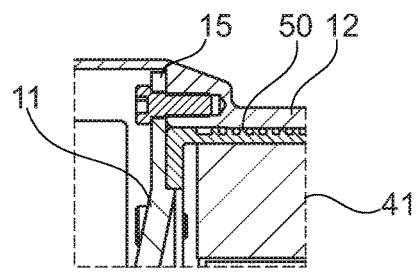
Figure 5A:
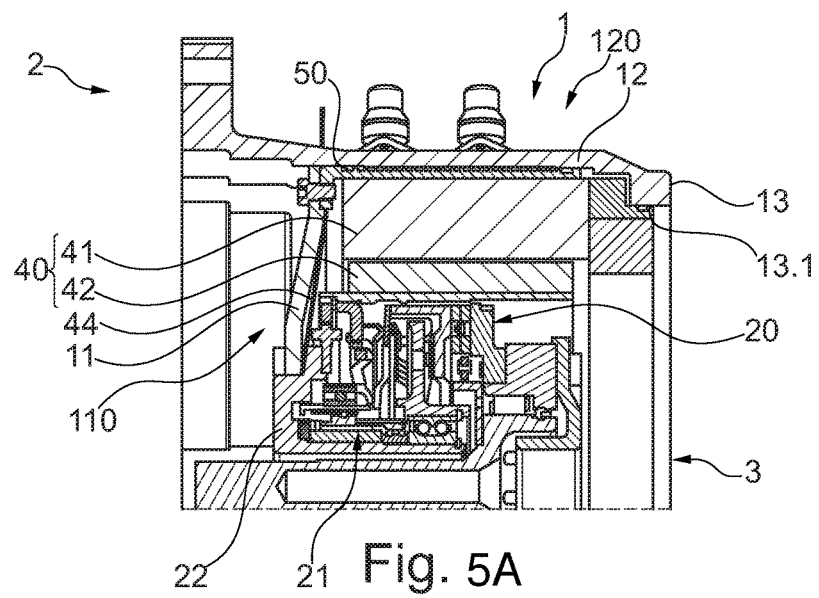
Figure 5C:
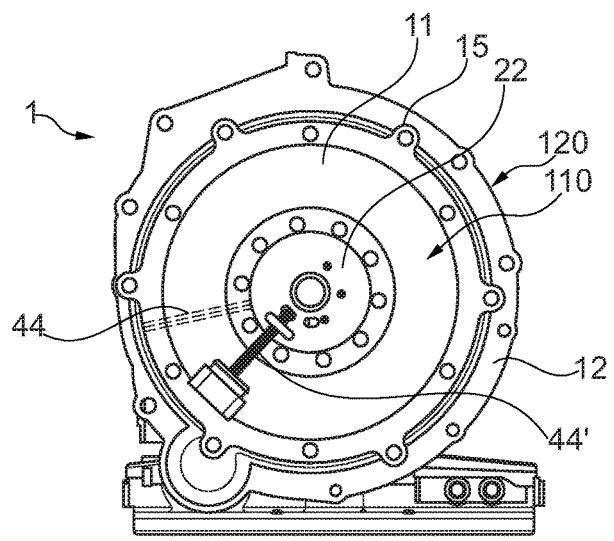

FIGS. 5A to 5C show a hybrid module 1 according to the invention, based on FIG. 2, with the hybrid module 1 comprising an intermediate wall as a first part 11, which forms the radially extending housing section 110. FIG. 5B shows a detail of a cross-section at different angular position than in FIG. 5A; FIG. 5C shows a view of the hybrid module from the internal combustion engine end 2. The second part 12 forms the axially extending housing section 120, which forms a chamber at the transmission end for the electric machine 40 and a chamber at the internal combustion engine end for the vibration damper 30, which has not been preassembled here. The clutch 20 is integrated in the rotor 42 and has as an actuating device 21 an electronic central shifter, which rests via a support device 22 at the intermediate wall. The stator 41 surrounds a cooling channel 50. The intermediate wall is screw-connected with its radially exterior end section at the cooling channel 50 and preferably at the second part 12. For this purpose the intermediate wall preferably comprises links 15 as well, which are discernible in FIG. 5C, so that screws can also be connected radially outside the cooling channel 50 in the material of the second part 12. Preferably the intermediate wall is screw-connected in a sealing fashion, e.g., via a rubber gasket, and seals the chamber for the vibration damper 30 from the chamber for the electric machine 40. A sensor cable 44 of a rotor position sensor is laid on the side of the intermediate wall facing the transmission end. 3. It is preferably guided through an opening of the second part 12 radially towards the outside. A control cable 44' for the electronic central shifter 21 is guided out of the support device 22 to the side of the intermediate area facing the internal combustion engine end 2 and is fixed along it. A flange 13 is formed inwardly at the end of the second part 12 at the transmission end, with the contour 13.1 formed by the flange 13 being at least sectionally being located inside the exterior diameter of the stator.

For assembling it, the cooling channel 50 is inserted and fastened in the second part 12 coming from the internal combustion engine end 2. Here, preferably at least the stator 41 has been previously connected to the cooling channel 50 to form an assembly. The assembly of the rotor 42 and the clutch 20 occurs then from the transmission end 3 or from the internal combustion engine end 2; the contour 13.1 of the flange 13 allows both options. Alternatively, the rotor 42 and the clutch 20 have also been connected already to the cooling channel 50 and the stator 41, and the assembly then occurs coming from the internal combustion engine side 2. Here it is advantageous that the wiring may have already been fastened at the intermediate wall. Subsequently the intermediate wall, coming from the internal combustion engine end 2, is inserted into the part 12 and here screw-connected to the cooling channel 50 and the second part 12.

This allows various options for the assembly.

FIG. 6A to 6C shows in various illustrations a hybrid module 1 according to the invention, based on FIG. 3. Unlike FIG. 3, the flange 13 is pulled outwardly, not inwardly. Additionally, the hybrid module 1 has a cooling channel 50. The housing halves 10.1 and 10.2 are each embodied in one piece. The transmission end housing half 10.2 has at the internal combustion engine end a flange 13' for the connection to the housing half 10.1 at the internal combustion engine end, which in turn has at the internal combustion engine end a flange 13" for connecting to the internal combustion engine. The two housing halves 10.1 and 10.2 are screw-connected to each other via the flange 13'. An electric contacting 45 is located between the housing halves 10.1 and 10.2 in a recess 14. When assembling occurs as shown in FIG. 6C, the support device 22 and the actuating device 21 are already connected to the housing half 10.1 at the internal combustion engine end forming an assembly.

A modular, flexible assembly is possible by the two housing halves. Additionally, only one housing half needs to be altered respectively to adjust the interface to the internal combustion engine or to the transmission, while the other one can remain unchanged.

Figure 7A:
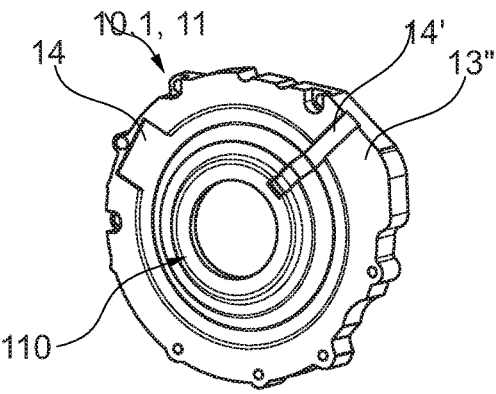
Figure 7B:
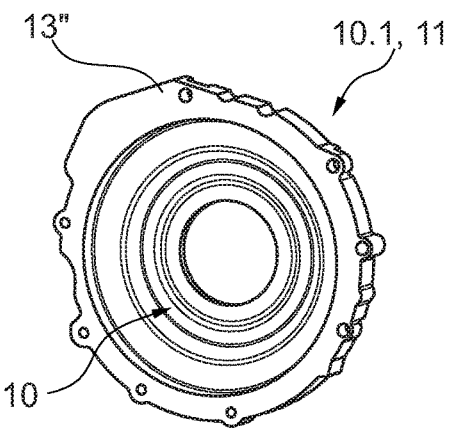
Figure 7C:
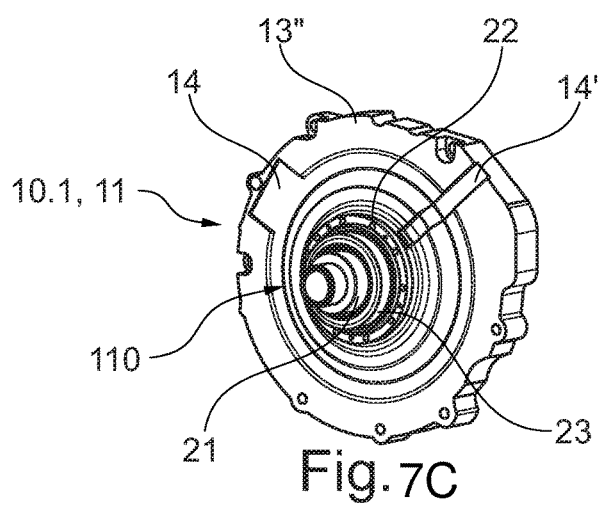
Figure 7D:
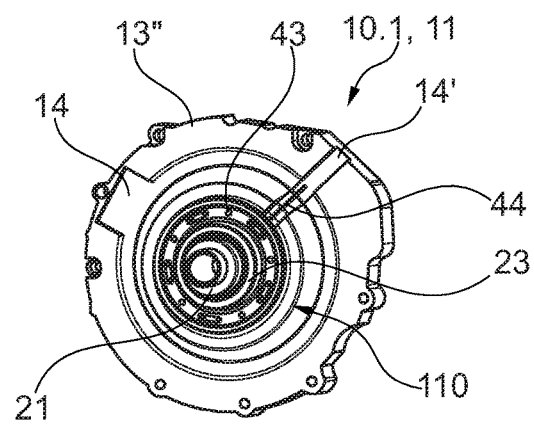

FIGS. 7A-7D show the housing half 10.1 at the internal combustion engine end of the module 1 of FIGS. 6A-6C in various illustrations and states of assembly. FIGS. 7A, 7C and 7D show the side facing the transmission end 3, FIG. 7B the side of the housing side 10.1 facing the internal combustion engine end 2, which forms a concave chamber for the vibration damper. The side facing the transmission end 3 comprises a recess 14 for the electric contacting for transmitting the electric drive energy, e.g., for a plastic-coated bus-bar for example, as well as a recess 14' for laying a rotor position sensor cable 44 of the rotor position sensor 43. This way any penetration through the radially extending housing section 110 is not required. In FIG. 7C the first part 11, the support device 22, the electronic central shifter 21, and a roller bearing 23 resting on the central shifter 21, are pre-mounted to form an assembly. In FIG. 7D this assembly comprises then additionally the rotor position sensor 43. Preferably the cable 44 for the rotor position sensor 14 is laid in the recess 14 and the corresponding plug is mounted. As soon as the clutch is also pre-mounted, the assembly is combined with the other housing half 10.2.

Figure 8A:
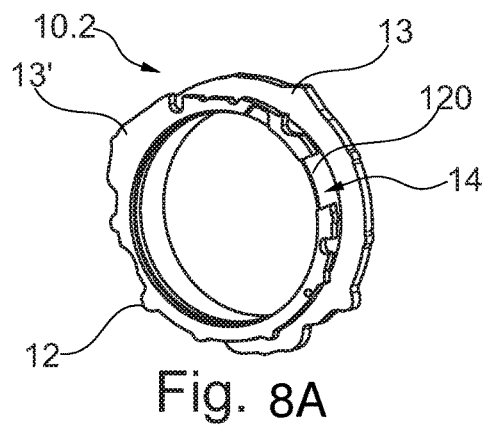
Figure 8B:
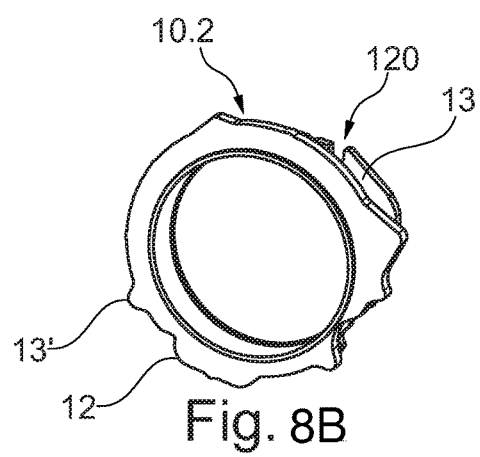
Figure 8C:
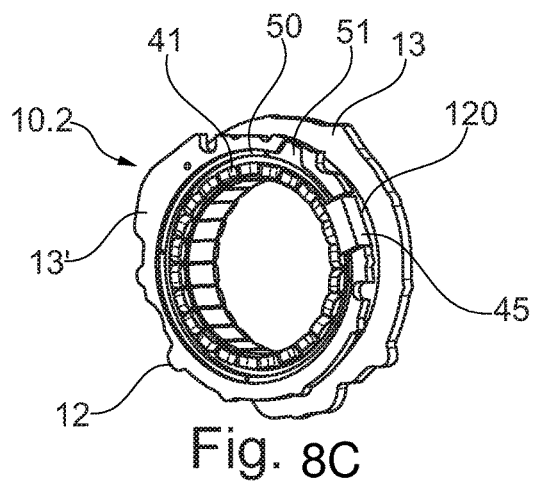
Figure 8D:
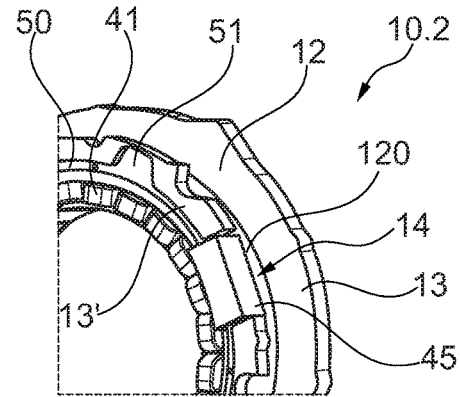

FIGS. 8A-8D show the transmission end housing half 10.2 of the module of FIG. 6A-6C in various views and states of assembly. FIGS. 8A, 8C, and 8D show the side facing the side 2 of the internal combustion engine, at which also a recess 14 is provided for electric contacting 45, which is directly opposite the recess 14 of the housing part 10.2 at the internal combustion engine end in the assembled state, FIG. 8B shows the side of the housing half 10.2 facing the transmission end 3. In FIG. 8C the cooling channel 50 and the stator 41 are inserted in the part 12 and preferably fastened there. The cooling channel 50 is preferably guided by one or more cooling channel flanges, which engage appropriate recesses of the part 12, and/or via them screw-connected thereto. The plastic-coated electric contacting 45 here inserts itself into the recess 14.

These two housing halves 10.1 and 10.2, adjusted to each other in a very advantageous fashion, considerably facilitate the assembly. In particular, the wiring expense is reduced.

This invention presents a hybrid module with a modular housing as well as a method for the assembly thereof. Here, the housing has two separate parts, with one of them forming an axially extending housing section and the other one a radially extending housing section, e.g., as an intermediate wall. The application with a separate part as a radially extending housing section offers the advantage like a model kit that such a part can perhaps be used for various types of hybrid modules. Only an adjustment of the housing occurs based on the structural space provided by the customer. This may yield cost benefits. Furthermore, the sequence of the assembly is subject to fewer restrictions. In particular, the invention also refers to a hybrid module with an intermediate wall separated from the hybrid module housing forming the first part. Furthermore, a splitting of the housing in to two separate individual housing halves offers advantages. The invention is particularly used for hybrid applications, in which a hybrid module, comprising a damper system, a separating clutch, and an E-motor, is arranged axially between an internal combustion engine and a transmission.

LIST OF REFERENCE CHARACTERS 1 hybrid module
2 internal combustion engine end
3 transmission end
4 shaft at the internal combustion engine end
5 shaft at the transmission end
10 housing
10.1 housing half at the internal combustion engine end
10.2 housing half at the transmission end
11 first part
12 second part
13 flange
13.1 contour formed by the flange
14 recess
15 link
20 clutch
21 actuator device
22 support device
23 bearing
30 vibration damper
40 electric machine
41 stator
42 rotor
43 rotor position sensor
44 sensor cable and/or control cable
45 electric contacting
50 cooling channel
51 cooling channel flange
110 radially extending housing section
120 axially extending housing section

The invention claimed is:

1. A hybrid module comprising a clutch, an electric machine, an internal combustion engine end, and a transmission end, with the hybrid module comprising a housing with a radially extending housing section, which is arranged at the internal combustion engine end axially next to the electric machine, and with an axially extending housing section that at least partially surrounds the hybrid module, the housing comprises first and second separate parts, with the first part forming the radially extending housing section and the second part forming the axially extending housing section, wherein at least one of the first part or the second part comprises a recess for guiding or passing through at least one of a sensor cable, a control cable, or an electric contacting to supply electric energy to at least one of the electric machine or an actuator device of the clutch.

2. The hybrid module according to claim 1, wherein the second part at the transmission end comprises a flange for connection of a transmission bell, which defines a contour that has at least one contour section, which is located radially inside an exterior diameter of the axially extending housing section.

3. The hybrid module according to claim 1, wherein the hybrid module further comprises a vibration damper and with the first part forming an intermediate wall arranged axially between the vibration damper on one side and at least one of the electric machine or the clutch on the other side and radially encompassing the vibration damper.

4. The hybrid module according to claim 1, wherein the first part is connected to at least one of the second part, a cooling channel, or a stator of the electric machine.

5. The hybrid module according to claim 1, wherein the housing comprises two housing halves, and one of the housing halves comprises the first part and the other one of the housing halves comprises the second part.

6. The hybrid module according to claim 5, wherein the recess is provided in an area in which the two parts are contacting each other or the recess is in an area in which the two housing halves are in contact to each other.

7. A method for producing a hybrid module with a clutch, an electric machine, an internal combustion engine end, a transmission end, and a housing, the method comprising:
connecting a first part to a second part, with the first part forming a radially extending housing section, which is arranged in an assembled state of the hybrid module at the internal combustion engine end axially next to the electric machine, and the second part forming an axially extending housing section that at least partially surrounds the hybrid module in the assembled state of the hybrid module,
further comprising after the connection of the first part and the second part:
inserting one or more of the following components of the hybrid module into the second part: cooling channel, stator, rotor, rotor position sensor, clutch; and
connecting an inserted component or at least one of several inserted components to at least one of the first part or the second part.

8. A method for producing a hybrid module with a clutch, an electric machine, an internal combustion engine end, a transmission end, and a housing, the method comprising:
connecting a first part to a second part, with the first part forming a radially extending housing section, which is arranged in an assembled state of the hybrid module at the internal combustion engine end axially next to the electric machine, and the second part forming an axially extending housing section that at least partially surrounds the hybrid module in the assembled state of the hybrid module,
wherein at least one of the first part or the second part comprises a recess for guiding or passing through at least one of a sensor cable, a control cable, or an electric contacting to supply electric energy to at least one of the electric machine or an actuator device of the clutch.

* * * * *